(12) United States Patent
Kawano et al.

(10) Patent No.: US 6,290,904 B1
(45) Date of Patent: Sep. 18, 2001

(54) WELDING MATERIALS FOR HIGH-CR STEELS

(75) Inventors: Takayuki Kawano; Kaneyasu Ishikawa; Nobuhiko Nishimura; Iwami Ishihara; Mitsushige Kumou, all of Nagasaki; Tamao Takatsu, Hamakita; Takashi Inami, Fukuoka, all of (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/234,184

(22) Filed: Jan. 20, 1999

(30) Foreign Application Priority Data

Jan. 20, 1998 (JP) .................................................. 10-008411

(51) Int. Cl.$^7$ ........................... C22C 38/20; C22C 38/22; C22C 38/42; C22C 38/44; C22C 38/32
(52) U.S. Cl. ................................. 420/37; 420/38; 420/39; 420/61; 420/64; 420/90; 420/106
(58) Field of Search ................................. 420/61, 64, 37, 420/38, 39, 90, 106

(56) References Cited

FOREIGN PATENT DOCUMENTS

| 01011092 A | 1/1989 | (JP) . | |
|---|---|---|---|
| 06142981 A | 5/1994 | (JP) . | |
| 06262388 A | 9/1994 | (JP) . | |
| 07096390 A | 4/1995 | (JP) | ................................. B23K/35/30 |
| 08057683 A | 3/1996 | (JP) | ................................. B23K/35/30 |
| 08120414 A | 5/1996 | (JP) . | |
| 08290290 A | 11/1996 | (JP) . | |
| 09122972 A | 5/1997 | (JP) . | |
| 09239584 A | 9/1997 | (JP) | ................................. B23K/35/30 |
| 09267190 A | 10/1997 | (JP) | ................................. B23K/35/30 |

OTHER PUBLICATIONS

Official Action of the original Japanese patent provisional application (Application No. 10–8411), Oct. 5, 1998.
Official Action of the original Japanese patent provisional application (Application No. 10–348362), Aug. 3, 1999.
European Search Report for corresponding Japanese Patent Application 99300280.7–2309, May 12, 1999.
Hiroshi Morimoto et al., Characteristics of the Weld of W–containing 9–Cr Ferritic Heat–resisting Steel, Japan Welding Assoc. for the first research meeting in the fiscal 1997 of the Committee for Exotic Welding Material, dated Jun. 17$^{th}$, 1997.

*Primary Examiner*—Deborah Yee
(74) *Attorney, Agent, or Firm*—Myers Bigel Sibley & Sajovec, P.A.

(57) ABSTRACT

This invention relates to welding materials for high-Cr steels which exhibit higher toughness and improved creep characteristics. Specifically, this invention relates to a welding material for high-Cr steels which contains, on a weight percentage basis, 0.03 to 0.12% C, up to 0.3% Si, 0.2 to 1.5% Mn, up to 0.02% P, up to 0.01% S, 8 to 13% Cr, 0.5 to 3% Mo, up to 0.75% Ni, 0.15 to 0.3% V, up to 0.01% Nb, 0.05 to 0.3% Ta, 0.1 to 2.5% W, 0.01 to 0.75% Cu, up to 0.03% Al, 0.002 to 0.005% B, up to 0.015% N, and up to 0.01% O, the balance being Fe and incidental impurities. It also relates to such welding materials wherein W is optionally excluded from the aforesaid composition, wherein W is excluded and 0.1 to 3% Co is added, or wherein 0.1 to 3% Co is added to the aforesaid composition.

3 Claims, 1 Drawing Sheet

WELDING MATERIALS FOR HIGH-CR STEELS

BACKGROUND OF THE INVENTION

1. Field of the Invention

This invention relates to welding materials for high-Cr steels which are suitable for use in boilers and turbines for electric power generation, chemical plants, and the like.

2. Description of the Related Art

When welding materials for high-Cr steels which have been developed up to now are used for welding purposes, the toughness of the weld metal is reduced. Consequently, in order to secure high toughness, welded joints formed by gas tungsten-arc welding (hereinafter abbreviated as GTAW) or gas metal-arc welding (hereinafter abbreviated as GMAW) must be subjected to a postweld heat treatment at 740–760° C.

However, where a high-Cr steel is used in combination with a low-Cr steel material (e.g., 2¼Cr-1Mo steel) for which a postweld heat treatment at a high temperature of 740–760° C. cannot be employed, it is conventional practice to first subject the high-Cr steel to a postweld heat treatment at 740–760° C. and then subject the 2¼Cr-1Mo steel, together with the high-Cr steel, to a postweld heat treatment at 700–730° C.

Accordingly, in order to overcome the disadvantage of requiring two-stage heat treatment, the present applicant has proposed, in Japanese Patent Provisional Publication No. 8-290290, a high-toughness welding material for high-Cr steels which permits high-Cr steels welded by GTAW and GMAW to be subjected to a postweld heat treatment at 700–730° C. similarly to 2¼Cr-1Mo steel, and thereby makes it possible to simplify the production process and save thermal energy.

Specifically, the welding material proposed in the aforementioned patent is a high-toughness welding material for high-Cr steels which is suitable for use in the gas tungsten-arc welding or gas metal-arc welding of high-Cr steels. Its chemical composition contains, on a weight percentage basis, up to 0.1% C, up to 0.3% Si, 0.2 to 1.5% Mn, up to 0.02% P, up to 0.01% S, 8 to 13% Cr, up to 0.75% Ni, 0.5 to 3% Mo, 0.18 to 0.25% V, 0.05 to 0.3% Ta, and 0.002 to 0.005% B, the balance being Fe.

In this welding material, Nb which has been contained in conventional welding materials for the purpose of enhancing creep rupture strength is replaced with Ta, and an appropriate amount of B is added, so as to strengthen grain boundaries and enhance long-time creep rupture strength and toughness. This makes it possible to perform the postweld heat treatment in a single stage instead of performing it in two stages using different temperatures, and thereby decrease the number of process steps and afford a saving of energy.

Recently, in order to improve the thermal efficiency of thermal electric power plants, materials having better temperature characteristics are being developed by using the composition of a conventional high-Cr steel as a basic composition and adding W, N and/or Co thereto, and are being put to practical use.

However, when such a homologous welding material using the composition of a high-Cr steel as a basic composition or a quasi-homologous welding materials obtained by replacing Nb contained in the basis composition with Ta and adding an appropriate amount of B is used for welding purposes, the toughness of the weld metal is markedly reduced and, therefore, cannot be satisfactorily restored by a postweld heat treatment at 700–730° C. Accordingly, where it is desired to use a high-Cr steel is in combination with 2¼Cr-1Mo steel, a structure of high-Cr steel is subjected to a postweld heat treatment at 740–760° C., while a structure of 2¼Cr-1Mo steel is subjected to a postweld heat treatment at 700–730° C. Thereafter, the aforesaid structure of high-Cr steel and the aforesaid structure of 2¼Cr-1Mo steel are welded together, and the resulting heterogeneous welded joint is locally subjected to a postweld heat treatment at 700–730° C. Alternatively, the aforesaid structure of high-Cr steel is subjected to a postweld heat treatment at 740–760° C. and then welded to a structure of 2¼Cr-1Mo steel. Thereafter, the resulting integral structure consisting of the structure of high-Cr steel and the structure of 2¼Cr-1Mo steel is subjected to a postweld heat treatment at 700–730° C. As used herein, the terms "homologous welding material" and "quasi-homologous welding material" mean welding materials in which the principal components are the same as those of the base metal.

SUMMARY OF THE INVENTION

Accordingly, an object of the present invention is to provide welding materials for high-Cr steels which make it possible to achieve a sufficient improvement in the toughness of welded joints of high-Cr steels as described above, by subjecting them to a single postweld heat treatment (i.e., a heat treatment at 700–730° C. for 2¼Cr-1Mo steel). Thus, after a structure of high-Cr steel as described above and a structure of 2¼Cr-1Mo steel are united together by using such a welding material, the resulting integral structure may be converted into a sound one by subjecting it to a single heat treatment at 700–730° C.

In order to obtain high-strength and high-toughness welded joints in 9Cr to 12Cr steel materials which are high-temperature and high-strength steel materials, it is effective to suppress the precipitation of ferrite and make crystal grains finer. As a result of extensive investigations conducted from this point of view, it has been discovered that the aforesaid purpose of suppressing the precipitation of ferrite and making crystal grains finer can be accomplished by adding appropriate amounts of Cu and Ta, and minimizing the addition of N. The present invention has been completed on the basis of this discovery.

That is, the present invention provides the following three welding materials for high-Cr steels.

(1) A welding material for high-Cr steels which contains, on a weight percentage basis, 0.03 to 0.12% C, up to 0.3% Si, 0.2 to 1.5% Mn, up to 0.02% P, up to 0.01% S, 8 to 13% Cr, 0.5 to 3% Mo, up to 0.75% Ni, 0.15 to 0.3% V, up to 0.01% Nb, 0.05 to 0.3% Ta, 0.1 to 2.5% W, 0.01 to 0.75% Cu, up to 0.03% Al, 0.002 to 0.005% B, up to 0.015% N, and up to 0.01% O, the balance being Fe and incidental impurities. (This welding material will hereinafter be referred to as the inventive material 1.)

(2) A welding material for high-Cr steels as described above in (1) wherein no W is positively added thereto and W is present in an amount introduced as an incidental impurity. (This welding material will hereinafter be referred to as the inventive material 2.) Accordingly, the content of W is on the same level as that of an incidental impurity.

(3) A welding material for high-Cr steels as described above in (1) and (2) wherein, on a weight percentage basis, 0.1 to 3% Co is further added thereto. (This welding material will hereinafter be referred to as the inventive material 3.)

Now, the action and effects of various components contained in the inventive materials 1 to 3 and the reasons for the restriction of their contents are described below. In the following description, all percentages are by weight unless otherwise specified.

(Inventive Material 1)

C: 0.03 to 0.12%

In order to maintain strength and secure hardenability, the lower limit of the C content is fixed at 0.03%. Since unduly high C contents will deteriorate weldability, an upper limit of 0.12% is placed. Accordingly, the content of C should be in the range of 0.03 to 0.12% and preferably 0.06 to 0.09%.

Si: up to 0.03%

Si is an element added as a deoxidizer. However, unduly high Si contents will cause a reduction in toughness. Accordingly, the content of Si should be up to 0.03% and preferably in the range of 0.15 to 0.25%.

Mn: 0.2 to 1.5%

Mn is a component which has a deoxidizing effect and is also necessary for the maintenance of strength. If its content is less than 0.2%, no sufficient effect will be produced. On the other hand, if its content is greater than 1.5%, a reduction in toughness will result. Accordingly, the content of Mn should be in the range of 0.20 to 1.5% and preferably 0.30 to 1.00%.

P: up to 0.02%

P is an impurity which is detrimental to weldability and high-temperature long-time creep strength, and a reduction in P content is effective in improving performance. Accordingly, the content of P should be up to 0.02%. No lower limit is placed on the P content because, if a lower content is placed, this requires an operation for controlling the P content so as to lie between its upper and lower limits and hence causes an increase in cost. Preferably, the content of P should be up to 0.01%.

S: up to 0.01%

S is an impurity which is detrimental to weldability and high-temperature long-time creep strength. Accordingly, the content of S should be up to 0.01%. Although a reduction in S content is effective in improving performance, no lower limit is placed with consideration for the fact that this causes an increase in cost. Preferably, the content of S should be up to 0.006%.

Cr: 8 to 13%

Cr is an element which serves to improve oxidation resistance and high-temperature strength. However, unduly high Cr contents may cause a reduction in weldability and induce embrittlement during use at high temperatures (550–650° C.). Accordingly, with consideration for the purpose of use and weldability, the content of Cr should be in the range of 8 to 13% and preferably 8.50 to 11.50%.

Mo: 0.5 to 3%

Mo is an element which is effective in improving creep strength. If its content is less than 0.5%, no sufficient effect will be produced. On the other hand, if its content is greater than 3%, a reduction in hot workability and toughness will result. Accordingly, the content of Mo should be in the range of 0.5 to 3% and preferably 0.80 to 1.50%.

Ni: up to 0.75%

Ni is an element which is effective in inhibiting the formation of 5-ferrite and stabilizing toughness. However, unduly high Ni contents will cause a marked decrease in workability as a result in a rise in hardness and, moreover, a reduction long-time creep strength. Accordingly, the content of Ni should be up to 0.75% and preferably in the range of 0.35 to 0.60%.

V: 0.15 to 0.3%

V is an element which is effective in improving creep strength. If its content is less than 0.15%, no sufficient effect will be produced. On the other hand, if its content is greater than 0.3%, the weldability will be detracted from. Accordingly, the content of V should be in the range of 0.15 to 0.3% and preferably 0.20 to 0.25%.

Nb: up to 0.01%

Nb is an element which is indispensable for the purpose of improving creep characteristics. In the welding material of the present invention, however, Ta is added in place of Nb so as to precipitate a carbide of Ta (TaC), produce a finer crystal grain structure, and thereby improve creep characteristics. Moreover, the addition of Nb causes a reduction in toughness. Accordingly, the content of Nb should be up to 0.01% which is a level introduced as an incidental impurity. Preferably, no Nb is added.

Ta: 0.05 to 0.3%

The addition of Ta is a feature of the present invention. Conventionally, in high-Cr steels to which the present invention is applicable, Nb having properties similar to those of Ta has been used in order to enhance high-temperature strength. In the present invention, however, Ta is added in place of Nb, except for Nb introduced as an incidental impurity. Thus, as compared with the case where Nb is positively added, the crystal grains become finer and an improvement in toughness is achieved. If its content is less than 0.05%, the resulting welding material will show variation in toughness and lack stability, and its effect of improving creep rupture strength will not be produced. On the other hand, if its content is greater than 0.3%, its carbide will coarsen and cause a reduction in high-temperature long-time creep strength and toughness. Accordingly, the content of Ta should be in the range of 0.05 to 0.3% and preferably 0.07 to 0.20%.

W: 0.1 to 2.5%

In welding materials for W-containing steels and (W, Co)-containing steels, W, like Mo, serves as a solid solution strengthening element and thereby contributes most to the improvement of creep characteristics. However, no beneficial effect will be produced at a W content of less than 0.1%. On the other hand, W contents of greater than 2.5% will cause a reduction in the toughness of the weld metal. Accordingly, the content of W should be in the range of 0.1 to 2.5% and preferably 0.60 to 1.30%.

Cu: 0.01 to 0.75%

Cu serves to suppress the precipitation of ferrite. However, no beneficial effect will be produced at a Cu content of less than 0.01%. On the other hand, unduly high Cu contents will cause a reduction in the toughness of the weld metal. Accordingly, the content of Cu should be in the range of 0.01 to 0.75% and preferably 0.30 to 0.60%.

Al: up to 0.03%

At unduly high contents, Al will hinder the flow of molten metal during welding and detract from the appearance of the bead. In order to prevent this problem. no Al is added and the amount of Al introduced as an incidental impurity is limited to 0.03% or less.

B: 0.002 to 0.005%

B is an element which is effective in improving creep rupture strength. If its content is less than 0.002%, no significant effect will be produced. On the other hand, if its content is greater than 0.005%, there is a possibility that a weld crack may occur. Accordingly, the content of B should be in the range of 0.002 to 0.005% and preferably 0.003 to 0.005%.

N: up to 0.015%

The addition of N is effective in improving creep characteristics by the precipitation of fine nitrides. However, in the welding material of the present invention, creep characteristics are improved by the precipitation of fine TaC. If N is added, Ta will react with N to form a nitride (TaN). This will suppress the precipitation of the carbide (TaC) and thereby lessen the effect of improving creep characteristics. Accordingly, no N is added and the amount of N introduced as an incidental impurity is limited to 0.015% or less.

O: up to 0.01%

O remains in the weld metal in the form of oxides, and causes a reduction in toughness and creep characteristics. Since it is desirable to minimize the O content, the amount of O introduced as an incidental impurity is limited to 0.01% or less.

(Inventive Material 2)

The composition of the inventive material 2 is the same as that of the inventive material 1, except for W. That is, no W is positively added and W is present in an amount introduced as an incidental impurity. Thus, the inventive material 2 provides a welding material for high-Cr steels which is sufficiently useful for practical purposes.

(Inventive Material 3)

The inventive material 3 is a welding material obtained by further adding 0.1 to 3% Co to the composition of the inventive material 2. Co is effective in inhibiting the formation of ferrite and stabilizing toughness. Moreover, like W and Mo, Co serves as a solid solution strengthening element and thereby contributes greatly to the improvement of creep characteristics. However, unduly high Co contents will cause a marked decrease in workability as a result in a rise in hardness. If its content is less than 0.1%, its effect of inhibiting the formation of ferrite and improving creep characteristics will not be produced. On the other hand, if its content is greater than 3%, a significant decrease in workability will result and the effect of improving creep characteristics will not be produced. Accordingly, the content of Co should be in the range of 0.1 to 3% and preferably 0.80 to 2.00%.

Moreover, a welding material obtained by further adding Co to the composition of the inventive material 1 is referred to as the inventive material 4.

Thus, high-strength and high-toughness welding materials for (W, Co)-free steels, W-containing steels, Co-containing steels and (W, Co)-containing steels can be obtained by adding appropriate amounts of Cu and Ta to the 9Cr to 12Cr steels which are high-temperature and high-strength steel materials, and minimizing the content of N therein.

As described above, the present invention provides welding materials for high-Cr steels which have higher toughness and can be used with high-Cr steel materials for high-temperature use.

DETAILED DESCRIPTION OF PREFERRED EMBODIMENTS

EXAMPLE 1

Figure 1:
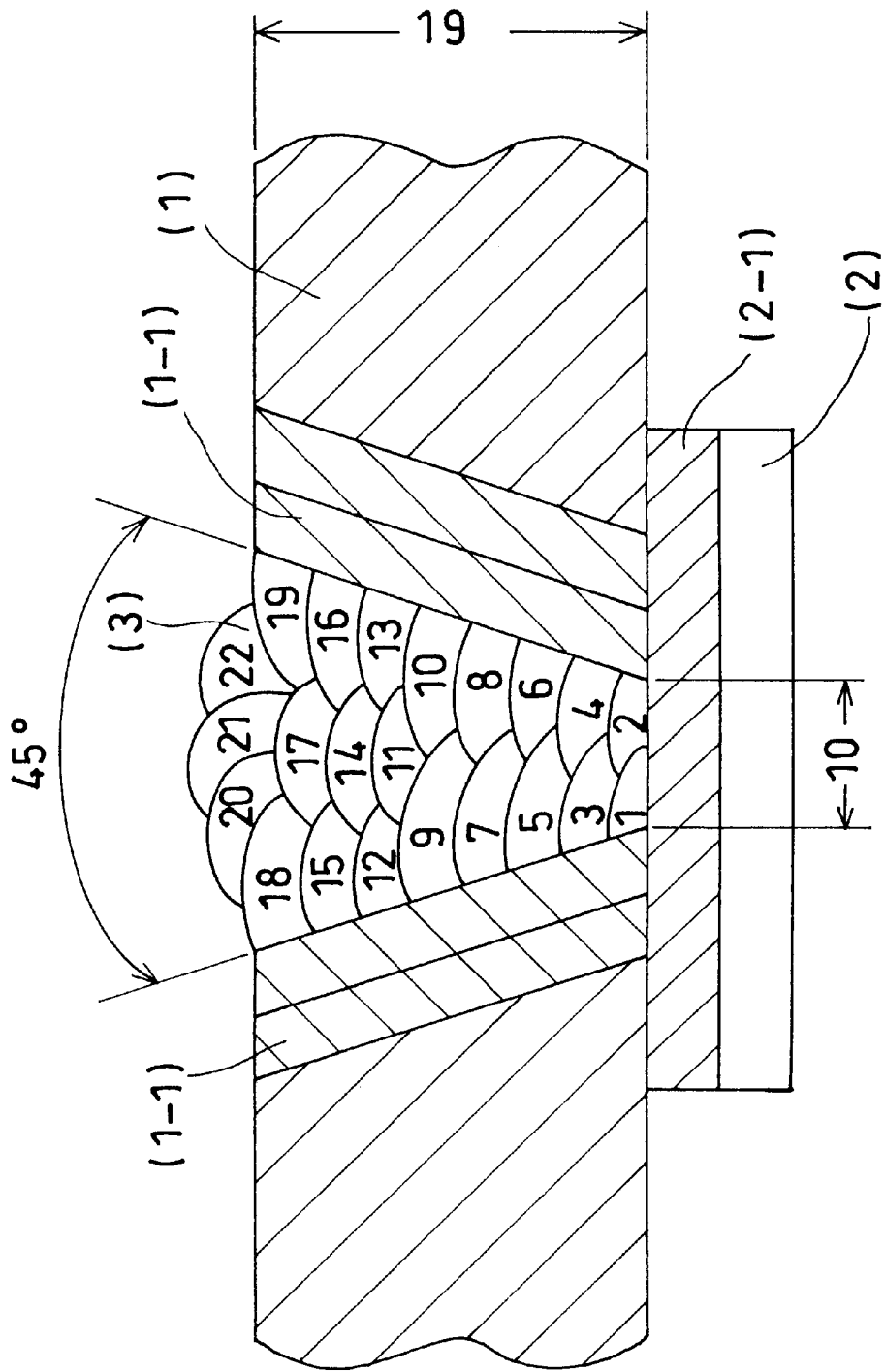
FIG. 1 is a schematic cross-sectional view illustrating a welded joint of high-Cr steel.

First of all, welding materials having the respective chemical compositions shown in Table 1 (in which Co is an incidental impurity) were prepared. Using these welding materials, two series of specimens were made by TIG welding. One series of specimens were subjected to a postweld heat treatment at 740° C. for 6 hours, while the other series of specimens were subjected to a postweld heat treatment at 715° C. for 1 hour. Then, these specimens were examined for the toughness of the weld metal, and the results thus obtained are shown in Table 2. In TIG welding, each welding material was drawn into a wire having a diameter of 1.2 mm and used in an automatic TIG welding machine under the conditions shown in Table 3.

TABLE 1

(wt. %)

| | C | Si | Mn | P | S | Ni | Cr | Mo | V | Nb | Ta | Cu | B | W | Co | N | O | Al | |
|---|---|---|---|---|---|---|---|---|---|---|---|---|---|---|---|---|---|---|---|
| A | 0.07 | 0.39 | 0.45 | 0.006 | 0.005 | 0.31 | 12.11 | 0.87 | 0.16 | — | 0.08 | 0.04 | 0.0030 | 0.17 | — | 0.025 | 0.0087 | 0.009 | Con- |
| B | 0.06 | 0.35 | 0.88 | 0.005 | 0.004 | 0.11 | 11.72 | 0.92 | 0.18 | — | 0.15 | 0.06 | 0.0045 | 0.45 | — | 0.020 | 0.0081 | 0.04 | ven- |
| C | 0.07 | 0.34 | 0.60 | 0.005 | 0.004 | 0.22 | 10.51 | 0.88 | 0.17 | 0.09 | — | 0.05 | — | — | — | 0.023 | 0.0077 | 0.02 | tional |
| D | 0.06 | 0.42 | 0.39 | 0.009 | 0.003 | 0.13 | 12.61 | 0.72 | 0.15 | 0.11 | — | 0.08 | 0.0036 | | — | 0.026 | 0.0069 | 0.01 | mat- |
| E | 0.07 | 0.40 | 0.51 | 0.008 | 0.005 | 0.33 | 10.22 | 0.83 | 0.17 | 0.08 | — | 0.03 | 0.0040 | | — | 0.023 | 0.0080 | 0.02 | erial |
| F | 0.08 | 0.21 | 0.40 | 0.006 | 0.003 | 0.40 | 8.99 | 0.85 | 0.20 | <0.010 | 0.06 | 0.42 | 0.0035 | 0.30 | <0.010 | 0.010 | 0.0071 | 0.007 | Inve- |
| G | 0.06 | 0.20 | 0.43 | 0.006 | 0.003 | 0.43 | 9.70 | 0.81 | 0.22 | <0.010 | 0 11 | 0.38 | 0.0042 | 0.28 | <0.010 | 0.012 | 0.0073 | 0.008 | ntive |
| H | 0.07 | 0.18 | 0.38 | 0.007 | 0.002 | 0.41 | 10.21 | 0.87 | 0.20 | <0.010 | 0.28 | 0.40 | 0.0040 | 0.31 | <0.010 | 0.008 | 0.0065 | 0.005 | mat- |
| I | 0.07 | 0.22 | 0.42 | 0.005 | 0.003 | 0.44 | 9.88 | 0.90 | 0.23 | <0.010 | 0.12 | 0.11 | 0.0038 | 2.37 | <0.010 | 0.011 | 0.0072 | 0.007 | erial |
| J | 0.08 | 0.20 | 0.39 | 0.004 | 0.003 | 0.43 | 10.90 | 0.91 | 0.21 | <0.010 | 0.09 | 0.10 | 0.0035 | 0.78 | <0.010 | 0.009 | 0.0068 | 0.007 | (Ex- |
| K | 0.06 | 0.23 | 0.40 | 0.005 | 0.002 | 0.40 | 11.73 | 0.85 | 0.22 | <0.010 | 0.11 | 0.72 | 0.0037 | 0.12 | <0.010 | 0.012 | 0.0070 | 0.006 | am- |
| L | 0.08 | 0.20 | 0.43 | 0.005 | 0.004 | 0.45 | 9.80 | 0.88 | 0.20 | <0.010 | 0.10 | 0.70 | 0.0042 | 1.50 | <0.010 | 0.010 | 0.0071 | 0.007 | ple 1) |
| M | 0.06 | 0.19 | 0.38 | 0.006 | 0.002 | 0.40 | 10.32 | 0.93 | 0.23 | <0.010 | 0.09 | 0.93 | 0.0044 | 1.13 | <0.010 | 0.021 | 0.0068 | 0.007 | Com- |
| N | 0.07 | 0.18 | 0.42 | 0.004 | 0.003 | 0.41 | 11.89 | 0.82 | 0.21 | <0.010 | 0.11 | 0.42 | 0.0040 | 3.01 | <0.010 | 0.022 | 0.0073 | 0.006 | para- |
| O | 0.07 | 0.22 | 0.41 | 0.007 | 0.003 | 0.43 | 10.31 | 0.87 | 0.24 | <0.010 | 0.02 | 0.38 | 0.0037 | 0.30 | <0.010 | 0.007 | 0.0072 | 0.008 | tive |
| P | 0.08 | 0.20 | 0.39 | 0.006 | 0.004 | 0.42 | 9.03 | 0.85 | 0.22 | <0.010 | 0.12 | 0.45 | 0.0039 | 2.88 | <0.010 | 0.008 | 0.0075 | 0.008 | mat- |
| Q | 0.07 | 0.23 | 0.38 | 0.006 | 0.002 | 0.41 | 9.75 | 0.89 | 0.22 | <0.010 | 0.09 | 0.90 | 0.0041 | 1.36 | <0.010 | 0.011 | 0.0071 | 0.007 | erial |

TABLE 2

| Designation | Impact value (J/cm²) at a test temperature of 0° C. | | |
|---|---|---|---|
| | Postweld heat treatment (740° C. × 6 hours) | Postweld heat treatment (715° C. × 1 hour) | |
| A | 29, 24, 36 | 18, 15, 22 | Conventional material |
| B | 31, 38, 45 | 21, 19, 30 | |
| C | 26, 36, 49 | 22, 20, 27 | |
| D | 9, 18, 34 | 8, 10, 21 | |
| E | 11, 21, 32 | 7, 13, 15 | |
| F | 99, 118, 131 | 63, 72, 73 | Inventive material 1 (Example 1) |
| G | 144, 146, 150 | 98, 87, 80 | |
| H | 132, 138, 140 | 88, 92, 85 | |
| I | 119, 122, 136 | 65, 58, 67 | |
| J | 93, 116, 122 | 70, 67, 75 | |
| K | 130, 126, 121 | 85, 78, 75 | |
| L | 140, 131, 146 | 92, 88, 90 | |
| M | 91, 113, 118 | 35, 27, 40 | Comparative material 1 |
| N | 146, 158, 166 | 28, 25, 31 | |
| O | 74, 43, 40 | 15, 21, 27 | |
| P | 55, 63, 45 | 29, 31, 35 | |
| Q | 58, 71, 66 | 35, 38, 36 | |

TABLE 3

| Polarity | Current (A) | Voltage (V) | Heat input (KJ/cm) | Shielding gas | Preheating and interpass temperature (° C.) | Shape of groove |
|---|---|---|---|---|---|---|
| DC straight polarity | 180 | 12 | 15 | Ar 100% (15 l/mm) | 200–250 | See FIG. 1 |

In Table 1, A to E are conventional materials on the marked, F to L are inventive materials, and M to Q are comparative materials. In the evaluation of welded joints, it is required that, when heat-treated under postweld heat treatment conditions (700–730° C.) for 2¼Cr-1Mo steel, the high-Cr steel weld metals comprising the inventive materials have sufficiently high toughness. Accordingly, 9Cr-1Mo steel was used as the base metal for welding tests. FIG. 1 illustrates a cross section of a welded joint in which the welded material comprised 9Cr-1Mo steel (1). Its chemical composition consists of 8.43% Cr, 0.99% Mo, 0.1% C, 0.39% Si, 0.4% Mn, 0.1% Ni, 0.08% Nb, 0.22% V, 0.051% N, and the balance being Fe and incidental impurities. The thickness was 19 mm, the groove angle was 450, and a multi-layer weld was performed in 22 layers. (2) represents a backing strip, and (3) represents a deposited metal (the numerals 1–22 indicate the order of deposition of layers in the multi-layer weld). (1-1) and (2-1) represent metal layers formed by buttering the base metal with a welding material to be tested.

Table 2 shows the results of 2 mm V-notched Charpy impact tests performed to examine the aforesaid specimens for the toughness of the deposited metal. The test temperature was 0° C. It can be seen from the results of Table 2 that the inventive materials show an impact value of not less than 50 J/cm², whether the postweld heat treatment conditions are 740° C.×6 hours or 715° C.×1 hour. In contrast, the conventional materials show an impact value of not greater than 50 J/cm² even when the postweld heat treatment conditions are 740° C.×6 hours, and the comparative materials show an impact value of not greater than 50 J/cm² when the postweld heat treatment conditions are 715° C.×1 hour.

Accordingly, the inventive materials may be said to have very good toughness.

EXAMPLES 2–4

First of all, welding materials having the respective chemical compositions shown in Table 4 (in which the content of W in the inventive materials 2 and 3 is on an incidental impurity level, and the content of Co in the inventive materials 2 is on an incidental impurity level) were prepared. Using these welding materials, two series of specimens were made by TIG welding. One series of specimens were subjected to a postweld heat treatment at 740° C. for 6 hours, while the other series of specimens were subjected to a postweld heat treatment at 715° C. for 1 hour. Then, these specimens were examined for the toughness of the deposited metal, and the results thus obtained are shown in Table 5. In TIG welding, each welding material was drawn into a wire having a diameter of 1.2 mm and used in an automatic TIG welding machine under the conditions shown in Table 3.

TABLE 4

| | (wt. %) | | | | | | | | | | | | | | | | | |
|---|---|---|---|---|---|---|---|---|---|---|---|---|---|---|---|---|---|---|
| | C | Si | Mn | P | S | Ni | Cr | Mo | V | Nb | Ta | Cu | B | W | Co | N | O | Al |
| R-1 | 0.07 | 0.22 | 0.41 | 0.006 | 0.002 | 0.44 | 10.37 | 0.88 | 0.20 | <0.010 | 0.07 | 0.73 | 0.0037 | 0.008 | 0.009 | 0.011 | 0.0075 | 0.006 | Inv-
| R-2 | 0.08 | 0.21 | 0.39 | 0.007 | 0.003 | 0.43 | 10.54 | 0.87 | 0.22 | <0.010 | 0.18 | 0.30 | 0.0035 | 0.011 | 0.012 | 0.009 | 0.0073 | 0.005 | en-

TABLE 4-continued (wt. %)

| | C | Si | Mn | P | S | Ni | Cr | Mo | V | Nb | Ta | Cu | B | W | Co | N | O | Al | |
|---|---|---|---|---|---|---|---|---|---|---|---|---|---|---|---|---|---|---|---|
| R-3 | 0.08 | 0.23 | 0.38 | 0.006 | 0.003 | 0.43 | 10.78 | 0.91 | 0.20 | <0.010 | 0.27 | 0.13 | 0.0038 | 0.015 | 0.010 | 0.012 | 0.0073 | 0.006 | tive material (Example 2) |
| S-1 | 0.08 | 0.20 | 0.42 | 0.005 | 0.003 | 0.44 | 11.01 | 0.93 | 0.23 | <0.010 | 0.10 | 0.38 | 0.0033 | 0.008 | 0.13 | 0.010 | 0.0069 | 0.007 | Inventive material (Example 3) |
| S-2 | 0.07 | 0.21 | 0.40 | 0.006 | 0.003 | 0.44 | 10.93 | 0.92 | 0.21 | <0.010 | 0.12 | 0.35 | 0.0034 | 0.010 | 0.98 | 0.007 | 0.0070 | 0.006 | |
| S-3 | 0.07 | 0.21 | 0.40 | 0.006 | 0.002 | 0.45 | 10.82 | 0.94 | 0.22 | <0.010 | 0.09 | 0.40 | 0.0032 | 0.011 | 1.78 | 0.009 | 0.0073 | 0.006 | |
| S-4 | 0.06 | 0.20 | 0.41 | 0.007 | 0.004 | 0.43 | 10.76 | 0.92 | 0.22 | <0.010 | 0.11 | 0.41 | 0.0033 | 0.009 | 2.89 | 0.012 | 0.0068 | 0.007 | |
| T-1 | 0.06 | 0.23 | 0.38 | 0.006 | 0.004 | 0.40 | 10.51 | 0.89 | 0.24 | <0.010 | 0.08 | 0.37 | 0.0038 | 2.13 | 0.15 | 0.010 | 0.0075 | 0.008 | Inventive material (Example 4) |
| T-2 | 0.07 | 0.22 | 0.40 | 0.007 | 0.005 | 0.41 | 10.63 | 0.91 | 0.23 | <0.010 | 0.12 | 0.41 | 0.0040 | 1.87 | 0.85 | 0.008 | 0.0075 | 0.008 | |
| T-3 | 0.07 | 0.23 | 0.39 | 0.007 | 0.003 | 0.42 | 10.97 | 0.92 | 0.20 | <0.010 | 0.10 | 0.39 | 0.0041 | 0.91 | 1.95 | 0.009 | 0.0073 | 0.007 | |
| T-4 | 0.07 | 0.24 | 0.41 | 0.006 | 0.004 | 0.40 | 10.75 | 0.88 | 0.22 | <0.010 | 0.09 | 0.35 | 0.0040 | 0.13 | 2.85 | 0.011 | 0.0072 | 0.006 | |
| U-1* | 0.08 | 0.23 | 0.42 | 0.006 | 0.004 | 0.41 | 10.67 | 0.93 | 0.23 | <0.010 | 0.11 | 0.38 | 0.0042 | 0.02 | 3.52 | 0.008 | 0.0071 | 0.007 | Comparative material 2 |

*Welding was impossible because many cracks were produced in the welding wire (1.2 mm in diameter) and caused breakage thereof.

TABLE 5

| | Impact value (J/cm²) at a test temperature of 0° C. | | |
|---|---|---|---|
| Designation | Postweld heat treatment (740° C. × 6 hours) | Postweld heat treatment (715° C. × 1 hour) | |
| R-1 | 257, 321, 296 | 176, 143, 151 | Inventive material 2 (Example 2) |
| R-2 | 331, 325, 318 | 187, 178, 161 | |
| R-3 | 310, 285, 318 | 180, 170, 172 | |
| S-1 | 231, 198, 190 | 105, 121, 113 | Inventive material 3 (Example 3) |
| S-2 | 185, 121, 163 | 98, 103, 96 | |
| S-3 | 131, 143, 136 | 90, 85, 73 | |
| S-4 | 123, 131, 104 | 74, 79, 63 | |
| T-1 | 121, 118, 105 | 73, 62, 61 | Inventive material 4 (Example 4) |
| T-2 | 110, 98, 103 | 85, 70, 71 | |
| T-3 | 123, 131, 120 | 71, 60, 65 | |
| T-4 | 141, 135, 127 | 63, 58, 57 | |
| U-1 | (Welding was impossible because the welding material was broken.) | | Comparative material 2 |

Table 4, R-1 to R-3, S-1 to S-4, and T-1 to T-4 are inventive materials. U-1 was prepared as a comparative material, but TIG welding using it was impossible because, when it was drawn into a wire having a diameter of 1.2 mm, the wire was broken or cracked.

As to the welded joint, the type of the base metal, the shape of the groove, the number of welding layers, and other conditions were the same as described in connection with FIG. 1.

Table 5 shows the results of 2 mm V-notched Charpy impact tests performed to examine the aforesaid specimens for the toughness of the deposited metal. The test temperature was 0° C. It can be seen from the results of Table 5 that the deposited metals comprising the inventive materials of Examples 2 to 4 show an impact value of not less than 50 J/cm², whether the postweld heat treatment conditions are 740° C.×6 hours or 715° C.×1 hour. Accordingly, these inventive materials may be said to have very good toughness.

What is claimed is:

1. A welding material for high-Cr steels which consists essentially of, on a weight percentage basis, 0.03 to 0.12% C, up to 0.3% Si, 0.2 to 1.5% Mn, up to 0.02% P, up to 0.01% S, 8 to 13% Cr, 0.5 to 3% Mo, up to 0.75% Ni, 0.15 to 0.3% V, up to 0.01% Nb, 0.05 to 0.3% Ta, 0.1 to 2.5% W, 0.01 to 0.75% Cu, up to 0.03% Al, 0.002 to 0.005% B, up to 0.015% N, and up to 0.01% O, the balance being Fe and incidental impurities.

2. A welding material for high-Cr steels as claimed in claim 1 wherein, on a weight percentage basis, 0.1 to 3% Co is further added thereto.

3. A welding material according to claim 1, wherein W is present as an incidental impurity.

* * * * *

UNITED STATES PATENT AND TRADEMARK OFFICE
CERTIFICATE OF CORRECTION

PATENT NO. : 6,290,904 B1
DATED : September 18, 2001
INVENTOR(S) : Kawano et al.

It is certified that error appears in the above-identified patent and that said Letters Patent is hereby corrected as shown below:

Title page,
Item [73], Assignee, please include
-- Nippon Welding Rod Co., Ltd.
   Tokyo (JP) --

Signed and Sealed this

Fifteenth Day of February, 2005

JON W. DUDAS
*Director of the United States Patent and Trademark Office*